United States Patent [19]

Welch

[11] Patent Number: 5,807,427
[45] Date of Patent: Sep. 15, 1998

[54] GAS/LIQUID SEPARATOR WITH CONTROLLABLE VARIABLE LIQUID LEVEL

[75] Inventor: Elmer Scott Welch, Silver Lake, Wis.

[73] Assignee: Sani-Matic, a Division of DEC International, Inc., Madison, Wis.

[21] Appl. No.: 566,682

[22] Filed: Dec. 4, 1995

[51] Int. Cl.⁶ ................................................. B01D 19/00
[52] U.S. Cl. ............................ 96/210; 55/417; 55/459.1; 55/459.3; 210/120; 210/512.1
[58] Field of Search .................... 55/417, 459.3, 55/460, 466, 459.1; 95/261; 96/210; 210/120, 512.1

[56] References Cited

U.S. PATENT DOCUMENTS

| | | |
|---|---|---|
| 812,855 | 2/1906 | Ljungggström . |
| 1,440,808 | 2/1923 | Wineman . |
| 2,710,664 | 6/1955 | Blackmore et al. ...................... 96/210 |
| 3,151,961 | 10/1964 | Blackmore et al. ...................... 96/210 |
| 3,359,708 | 12/1967 | Barber . |
| 3,771,290 | 11/1973 | Stethem . |
| 3,996,027 | 12/1976 | Schnell et al. . |
| 4,363,641 | 12/1982 | Finn, III . |
| 4,390,351 | 6/1983 | Matsui et al. .............................. 96/210 |
| 4,555,253 | 11/1985 | Hull et al. ................................ 134/108 |
| 5,000,766 | 3/1991 | Yano et al. ................................ 55/417 |
| 5,338,341 | 8/1994 | Mazzei et al. ............................. 96/210 |
| 5,392,797 | 2/1995 | Welch ..................................... 134/108 |
| 5,398,733 | 3/1995 | Welch ........................................ 141/4 |
| 5,603,826 | 2/1997 | Welch ................................... 210/195.1 |

FOREIGN PATENT DOCUMENTS

| | | | |
|---|---|---|---|
| 73382 | 1/1944 | Czechoslovakia | ........................ 55/417 |
| 58290 | 10/1967 | German Dem. Rep. | ................ 96/210 |

*Primary Examiner*—C. Scott Bushey
*Attorney, Agent, or Firm*—Rockey, Milnamow & Katz, Ltd.

[57] ABSTRACT

A gas/liquid separator for separating an inlet stream of a mixture of a gas and a liquid into a substantially liquid stream and a substantially gaseous stream, the separator having a controllable, variable liquid level, includes an elongate cylindrical body portion having first and second closed ends which define a separation chamber, tangentially oriented inlet and outlet nozzles positioned near the ends of the vessel, and an overflow-discharge nozzle extending from inside of the separation chamber and longitudinally exiting from the separator through the inlet end, proximate to the inlet nozzle. The separator further includes a vent subassembly positioned proximate to the overflow-discharge nozzle. The subassembly includes a nozzle in flow communication with the separation chamber, and a flow-stop device operable between an open condition and a closed condition. The flow-stop device is positioned on the nozzle. The inlet mixture is separated in the separation chamber with at least a portion of the substantially gaseous stream discharging through the vent assembly when the flow-stop device is in the open condition, and with the substantially gaseous stream remaining in the separation chamber increasing an internal pressure thereof and decreasing the liquid level therein, when the flow-stop device is in the closed condition.

6 Claims, 2 Drawing Sheets

FIG. 1
FIG. 5
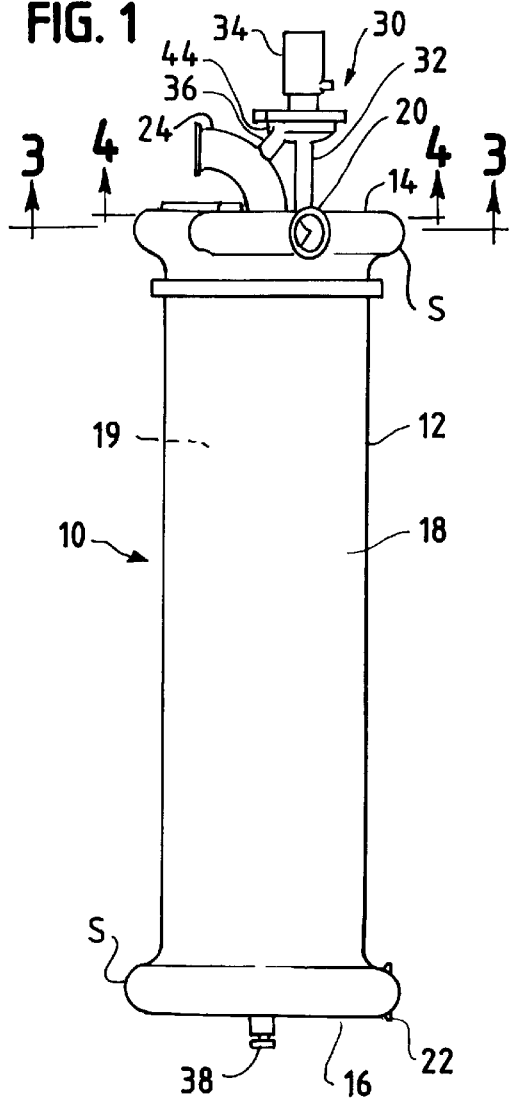
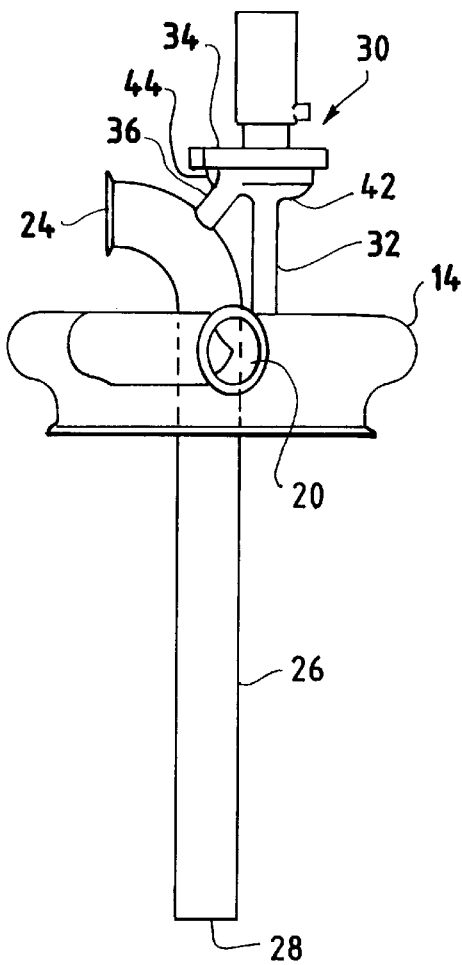
FIG. 2
FIG. 3
FIG. 4
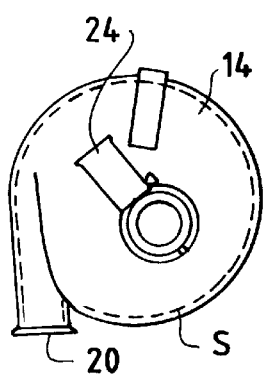
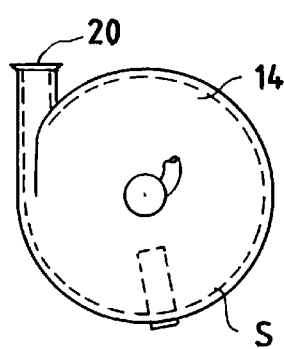
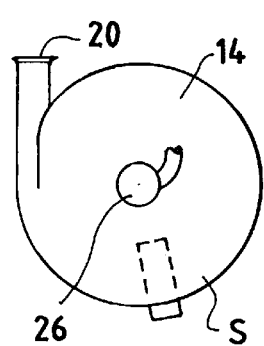

GAS/LIQUID SEPARATOR WITH CONTROLLABLE VARIABLE LIQUID LEVEL

FIELD OF THE INVENTION

This invention pertains to gas/liquid separators, and more particularly to gas/liquid separators having a controllable, variable liquid level which is proportional to the residence time of the liquid in the separator vessel.

BACKGROUND OF THE INVENTION

Separators are known for use in many types of industrial processes. For example, gas/liquid separators are used in diverse processes in the chemical, petrochemical, pharmaceutical, dairy processing and like industries.

In such processes, separators may be used to separate a gaseous-liquid mixture into a substantially gaseous stream and a substantially liquid stream, for later use of either the liquid or gas. In applications where it is desired to separate a gas, such as air, from a liquid stream, such devices may also be referred to as deaerators. Exemplary of such separators and deaerators are disclosed in U.S. Pat. No. 4,555,253 to Hull et al., U.S. Pat. No. 4,363,641 to Finn, III, U.S. Pat. No. 3,771,290 to Stethem and U.S. Pat. No. 1,440,808 to Wineman.

In one application, the separator may be used to facilitate removing foreign material from a process system by using the separator in a "feed-and-bleed" arrangement. Such an arrangement may be used, for example, in the dairy industry, whereby a vessel is flushed by introducing a fresh cleaning liquid into a process vessel, and continuously "bleeding" the soil laden return volume from the separator. Such a system is disclosed in Welch, U.S. Pat. No. 5,392,797, which patent is commonly assigned herewith, and the disclosure of which patent is incorporated herein by reference.

Typically, separators include a vertically oriented cylindrical body and tangentially positioned inlet and outlet nozzles located at about the upper and lower ends thereof, respectively. The separators include a nozzle, generally located near the top of the separator body for venting off the gas separated from the inlet stream.

Some type of arrangement, such as a float valve or perforated tube may be positioned within the separator body to assist in the separation process. In others, vanes may be used to facilitate a swirling action of the liquid in an effort to separate the gas from the liquid in the inlet stream.

One of the major drawbacks to the known separators is that the liquid level is not directly controllable, but is controlled only through manipulation of the general process control parameters. That is, the liquid level is controlled by varying the hydrodynamic characteristics of the process system, e.g., flow rate, velocity and pressure of the inlet and outlet streams.

Moreover, it is theorized that the liquid level in the separator is proportional to the residence time or the dwell time of the liquid in the separator vessel. Thus, the greater the liquid level, the greater the residence time of the liquid in the separator.

Thus, there continues to be a need for a separator which has a directly controllable, variable liquid level to facilitate control of the residence time of the liquid in the separator vessel.

SUMMARY OF THE INVENTION

A gas/liquid separator with controllable variable liquid level for separating an inlet stream of a mixture of a gas and a liquid into a substantially liquid stream and a substantially gaseous stream, includes an elongate cylindrical body having first and second closed ends which define a separation chamber.

The separator has a tangentially oriented inlet nozzle positioned near one of the ends and a tangentially oriented outlet nozzle positioned near the other end. An overflow-discharge nozzle extends from inside of the separation chamber and longitudinally exits from the separator through one of the ends.

A vent subassembly is positioned proximate to the overflow-discharge nozzle. The subassembly includes a vent nozzle which is in flow communication with the separation chamber through a penetration in the vessel at the inlet end and a flow-stop device, such as a valve, positioned on the nozzle. In a preferred embodiment, the valve is configured to discharge to the overflow-discharge nozzle.

A mixture of gas, for example air, and liquid is introduced into the separator through the inlet nozzle with sufficient hydrodynamic force to circulate the mixture in the vessel. A relatively solid liquid stream is discharged from the outlet nozzle. The overflow-discharge nozzle is configured to discharge a range of phase media from a relatively solid liquid stream to a gaseous stream. The discharge is at least in part dependent upon the level of liquid within the separator.

The liquid level in the separator is regulated or controlled by controlling the release or accumulation of the separated gas within the separator, by opening and closing the valve located at the top of the vent nozzle. When the valve is closed, the gas in the vessel accumulates which results in an increase in gas pressure in the vessel. The increased gas pressure exerts a force on the liquid, thus decreasing the level of liquid in the vessel and forcing liquid out of the vessel through the overflow-discharge nozzle.

Conversely, when the valve is open, the gas pressure in the vessel is reduced, thus permitting the liquid level to rise and reducing the driving force for discharging liquid from the vessel through the overflow-discharge nozzle.

In a preferred embodiment, the inlet and outlet ends at about their respective nozzles have a scroll-case configuration to facilitate a swirling action of the inlet mixture, and to reduce hydrodynamic losses of the outlet stream.

Other features and advantages of the present invention will be apparent from the following detailed description, the accompanying drawings, and the appended claims.

BRIEF DESCRIPTION OF THE FIGURES

FIG. 1 is a front, plan view of a gas/liquid separator with controllable, variable liquid level, illustrated with scroll-case configured inlet and outlet ends, in accordance with the principles of the present invention;

FIG. 2 is a top view of the separator of FIG. 1;

FIG. 3 is a cross-sectional view of the inlet end of the separator taken along line 3—3 of FIG. 1;

FIG. 4 is cross-sectional view of the inlet end of the separator taken along line 4—4 of FIG. 1;

FIG. 5 is a front, plan view of the inlet end of the separator, removed from the separator vessel, and showing the overflow-discharge nozzle and vent subassembly integral with the inlet end;

DETAILED DESCRIPTION OF THE PREFERRED EMBODIMENTS

Figure 6A:
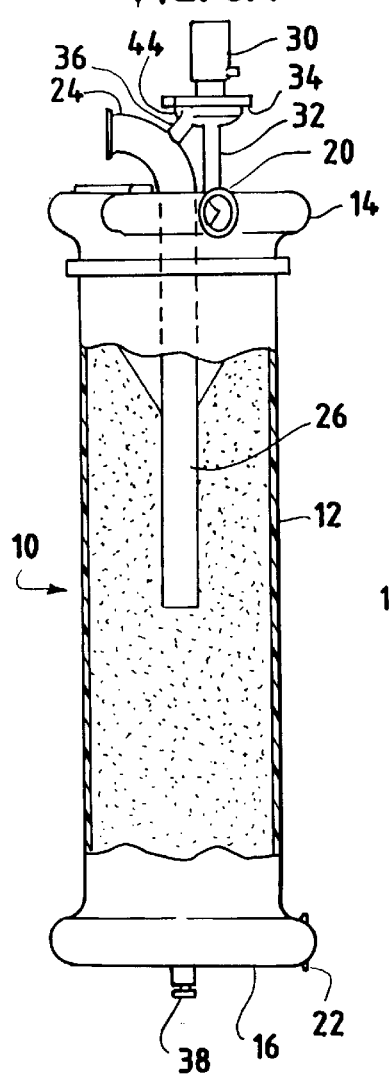
FIG. 6A is a front, plan view similar to FIG. 1, having a portion of the separator wall removed for clarity of illustration of the interior of the separator, the separator being in operation with the vent line valve open.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Referring now to FIG. 1, there is shown a gas/liquid separator with controllable, variable liquid level 10, in accordance with the principles of the present invention. The separator 10 includes an elongated, vertically oriented cylindrical body portion 12 having first and second closed ends, 14, 16, defining a separator vessel 18. For purposes of the present discussion, the first end 14 will be referred to as the inlet end and the second end 16 will be referred to as the outlet end. The enclosed vessel 18 defines a separation chamber 19.

The separator 10 includes a tangentially oriented inlet nozzle 20 located near the inlet end 14, and a tangentially oriented outlet nozzle 22 located near the outlet end 16. As best seen in FIG. 1, the inlet and outlet nozzles 20, 22 are positioned along a spiral path about the body 12 so that a liquid stream introduced into the separator 10 through the inlet nozzle 20, which liquid may flow in a spiral pattern down the separator body 12, has a relatively unobstructed flow path out of the separator 10 through the outlet nozzle 22. The outlet nozzle 22 is positioned at a low point in the separator 10 and serves the dual function of providing a drain for the separator 10.

In a preferred embodiment, the inlet and outlet ends 14, 16, at their respective nozzles 20, 22, have a scroll-case configuration, illustrated generally at S. This configuration, which is illustrated in FIGS. 2–4, is like that of a snail shell, in that it has an increasing diameter toward an entry or exit port. This configuration facilitates imparting a swirling or spiraling motion to the inlet stream, and concomitantly facilitates a relatively smooth liquid outlet flow profile.

The separator includes an overflow-discharge nozzle 24. The overflow-discharge nozzle 24, which is shown in FIG. 5, without the vessel 18 for clarity of illustration, has a depending or longitudinal portion 26 which extends into the vessel 18 when the separator is assembled, and a portion which exits the vessel 18 through the inlet end 14. In a preferred embodiment, the depending portion 26 extends into the vessel 18 to about midway between the inlet and outlet ends 14, 16. Hence, the fluid entry 28 into the overflow-discharge nozzle 24 is at a fixed location about midway between the inlet and outlet nozzles 20, 22. The depending or longitudinal portion 26 is fluid-impervious within the vessel 18 except for the fluid entry 28.

The separator also includes a vent subassembly 30. Referring now to FIGS. 1 and 5, there is illustrated an embodiment of the vent subassembly 30 which includes a vent nozzle 32, a flow stop device 34, such as the exemplary valve, and a vent discharge line 36. In the illustrated embodiment, the vent nozzle 32 penetrates directly into the vessel 18 through the inlet end 14.

Optionally, the separator also includes one or more instrument taps 38 (one shown) for monitoring process conditions. The instrument tap 38 may also be used to provide monitoring and control signals for automatic control of the process system. The tap 38 may further be used to add or replace liquid to the system in the event that small amounts of liquid are lost therefrom.

The flow-stop device 34, such as the exemplary vent valve, is mounted to the nozzle 32 end opposite the vessel 18 penetration. The vent valve 34 is mounted such that the inlet side 42 of the valve is in communication with the flow from the vessel 18. The outlet side 44 of the valve is routed through the vent discharge line 36 to the overflow-discharge line 24. It will be recognized by those skilled in the art, from a study of the present configuration and the description of the operation of the separator 10, that the vent discharge line 36 can be routed to any number of sources, such as a vent system, a separate piping system, or the like; such alternate configurations are to be considered within the scope of the present invention.

Figure 6B:
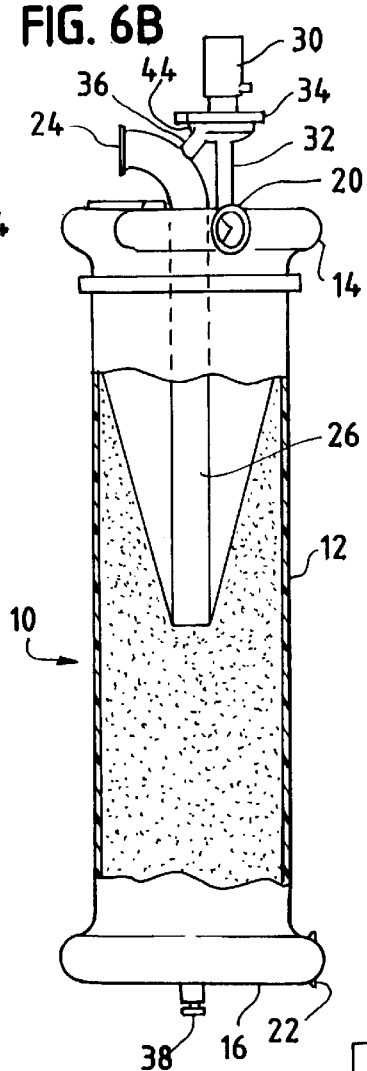
FIG. 6B is a view similar to FIG. 6A, with the separator operating with the vent line valve closed.

With reference now to FIGS. 6A and 6B, the operation of the separator 10 will be described. The operation of the separator 10 is described with reference to an inlet stream of water and air. It will be recognized by those skilled in the art that the inlet stream can, of course, be of any number of liquid/gaseous streams, and that the present invention should not be construed to be limited to the water/air system described.

The water/air inlet stream enters the separator through the inlet nozzle 20. FIG. 6B illustrates the separator 10 with the vent valve 34 in the closed position. Thus, the air which is separated from the inlet stream cannot escape from the top of the separator 10. As the inlet flow continues, the mass of air in the separator 10 accumulates toward the top thereof, resulting in an increase in air pressure within the separator 10.

The increased air pressure depresses the water level, which, in turn, reduces the total water inventory in the separator. It is contemplated that the bottom of the water cone level, as illustrated in FIG. 6B, in the separator 10 will be depressed to about the inlet of the overflow-discharge nozzle 24. The increased pressure urges or forces the water out of the separator 10, through the overflow-discharge nozzle 24. In this mode of operation, i.e., the reduced water level mode of operation, the residence or dwell time of water in the separator is reduced.

Conversely, as shown in FIG. 6A, when the vent valve 34 is open, as the separator 10 is operating in the recirculation mode, the vessel 18 is essentially open to atmosphere. The air which is separated from the inlet stream flows outward from the vessel 18.

In the illustrated embodiment, the air flows from the vessel through the vent nozzle 32, the vent valve 34, and out through the vent discharge line 36. The water in the vessel is thus subject to hydrodynamic pressure only, and is not subject to an accumulated air pressure. Hence, the water level and concomitantly the water inventory within the vessel 18, increases vis-a-vis the closed valve 34 condition. Consequently, the residence or dwell time of water in the separator is increased.

It should be noted that when the separator 10 is operating in the closed vent mode, as illustrated in FIG. 6B, the increased pressure in the vessel 18, which results from the accumulation of air in the vessel, provides sufficient driving force to force the water out of the separator 10 through the overflow-discharge nozzle 24. Conversely, when the separator 10 is operating in the open vent mode, as illustrated in FIG. 6A, the gas pressure in the vessel 18 is not sufficient to drive the water from the separator 10 through the overflow-discharge nozzle 24.

The separator 10 will now be described in one exemplary use, with reference to the aforementioned Welch, U.S. Pat. No. 5,392,797, which is entitled "Single Motive Pump, Clean-In-Place System, For Use With Piping Systems And With Vessels," and the disclosure of which is incorporated herein by reference. In the disclosed clean-in-place ("C-I-P") system, essentially two modes of operation are described for cleaning a vessel or piping system, namely, a rinse mode in which high flow rates of water are used to remove heavy loads of contaminant, and a wash mode, in which the vessel or piping system is washed in a recirculation arrangement using a cleaning solution.

During the rinse mode, it is desirable to create a high mass flow rate through the system to place and maintain the contaminants in solution and to remove the heavily contaminant-laden liquid as quickly as possible. This reduces the opportunity for contaminants to remain in the system and "fall out" onto the system components. This is accomplished by using high flow rates of water input to, and discharge from, the system, i.e., a "feed and bleed" of rinse water.

During the rinse cycle, the vent subassembly 30 of the separator 10 is set to the closed condition to maintain a low water level in the separator 10. Thus, air accumulation in the separator 10 results in increased pressure in the separation chamber 19. The increased pressure in the chamber 19 causes a depression of the water level, which, in turn, forces the liquid (which consists principally of water laden with contaminants) out of the separator 10 through the overflow-discharge nozzle 24. In this arrangement, it is contemplated that the flow from overflow-discharge nozzle 24 is directed to a drain.

The depressed water level results in a decreased water inventory in the separator 10. The decreased water level, in turn, results in a shorter residence time of water in the vessel, thus, less time for the contaminants to fall out of solution, back onto the system components.

During the wash cycle, other operating parameters dominate. It is contemplated that the separator 10 will first be filled with water. With respect to the operating parameters, rather than minimizing residence time of the water to eliminate the contaminants from the system, it is desired to maximize residence time in the separator 10 to minimize the entrainment of air in the liquid. Thus, during the wash cycle, the separator is operated with the vent valve 34 in the open condition to maintain a high or an increased water level in the separator 10. Minimizing entrained air in the outlet stream is desirable because the outlet stream is used to feed a pump, and because entrained air in the pump feed stream may have adverse effects on the operation of the pump.

The increased residence or dwell time of the water and air mixture is desired in that some of the entrained air is in the form of small bubbles, and separation is not instantaneous. Thus, increased time in the separator 10 provides increased time to permit the air to separate from the water. As the air-water mixture flows into the separator 10, the air flows inward and to the top thereof due to mass differential, centrifugal force and gravity. The water on the other hand, travels an opposite path, flowing outward toward the separator body 12 and downward to the outlet nozzle 22.

Figure 7:
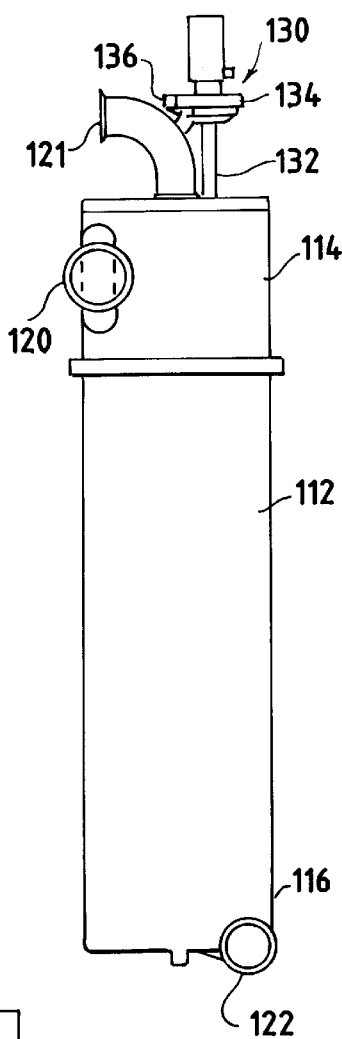
FIG. 7 is a front, plan view of an alternate embodiment of the gas/liquid separator with controllable, variable liquid level.

An alternate embodiment 110 of the separator is illustrated in FIG. 7. The separator 110 includes a cylindrical body 112, and inlet and outlet ends 114, 116. Inlet and outlet nozzles 120 and 122 are positioned at about the respective inlet and outlet ends 114, 116. The separator 110 differs from the embodiment illustrated in FIGS. 1–6B in that the ends 114, 116 are flush with the body 112 and do not include the scroll-case configuration. The separator 110 operates in the same manner as the embodiment 10 illustrated in FIGS. 1–6B.

Figure 8:
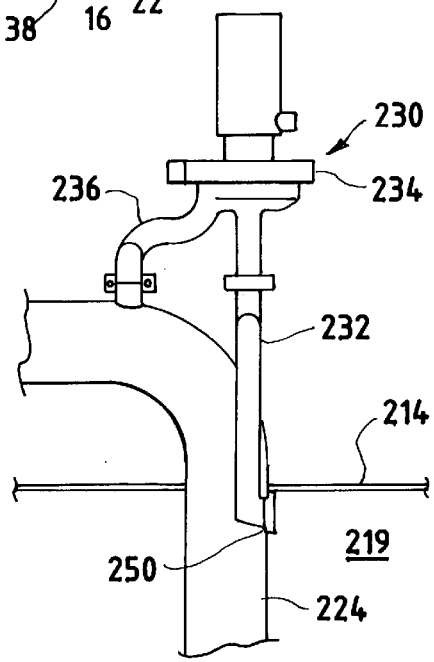
FIG. 8 is a front, plan view, illustrated in partial cross-section relative to the vessel end, of an alternate configuration for the vent subassembly.

An alternate embodiment 230 of the vent subassembly is illustrated in FIG. 8. The vent subassembly includes a vent nozzle 232, a flow stop device 234, such as the exemplary valve and a vent discharge line 236. In this embodiment, the vent nozzle 232 is routed essentially within the overflow-discharge nozzle 224. This configuration eliminates the need for an additional penetration through the inlet end 214 of the vessel.

The vent nozzle 232 is open to the separation chamber 219 through a penetration 250 in the overflow-discharge nozzle 224 in the portion of the overflow-discharge nozzle 224 which is within the chamber 219. The vent nozzle 232 is, however, sealed and isolated from flow communication with the overflow-discharge nozzle 224 where the vent nozzle 232 is internal thereto.

This configuration has the advantages of having a unitary construction and eliminating a penetration in the separator vessel end 214.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A gas/liquid separator for separating an inlet stream of a mixture of a gas and a liquid into a substantially liquid stream and a substantially gaseous stream, the separator having a controllable, variable liquid level, comprising:

an elongate cylindrical body portion having first and second closed ends and defining a separation chamber;

a tangentially oriented inlet nozzle positioned near one of said first and second ends;

a tangentially oriented outlet nozzle positioned near the other of said first and second ends;

an overflow-discharge nozzle extending from inside of said separation chamber, being fixed to said body portion and being fluid-impervious within said separation chamber except for a fluid entry at a fixed location about midway between said inlet and outlet nozzles, and longitudinally exiting from said separator through one of said first and second ends at a location proximate to said inlet nozzle; and a vent subassembly positioned proximate to said overflow-discharge nozzle, said subassembly including a vent nozzle in flow communication with said separation chamber, and a flow-stop device operable between an open condition and a closed condition, said flow-stop device being positioned on said vent nozzle, wherein the inlet mixture is separated in said separation chamber with at least a portion of the substantially gaseous stream discharging through said vent subassembly, when said flow-stop device is in said open condition, and wherein said substantially gaseous stream remains in said separation chamber increasing an internal pressure thereof and decreasing the liquid level therein, when said flow-stop device is in said closed condition.

2. The gas/liquid separator of claim 1 wherein said flow-stop device is a valve.

3. The gas/liquid separator of claim 1 wherein said tangential inlet and outlet nozzles are positioned generally along a spiral path.

4. The gas/liquid separator of claim 1 further including inlet and outlet sections having said respective inlet and outlet nozzles positioned thereabout, and wherein at least one of said inlet and outlet sections has a scroll-case configuration.

5. The gas/liquid separator of claim 1 wherein said flow-stop device is configured to discharge to said overflow-discharge nozzle.

6. The gas/liquid separator of claim 1 wherein said vent nozzle is positioned at least in part in said overflow-discharge nozzle.

* * * * *